UNITED STATES PATENT OFFICE.

HYDESABURO OHASHI, OF NEW YORK, N. Y.; MARIE V. OHASHI ADMINISTRATRIX OF SAID HYDESABURO OHASHI, DECEASED.

CARBON-PAPER AND INK COMPOSITION THEREFOR.

1,328,188. Specification of Letters Patent. Patented Jan. 13, 1920.

No Drawing. Application filed December 5, 1916. Serial No. 135,198.

*To all whom it may concern:*

Be it known that I, HYDESABURO OHASHI, a subject of the Emperor of Japan, residing at New York, in the county of New York and State of New York, have invented new and useful Improvements in Carbon-Papers and Ink Composition Therefor, of which the following is a specification.

This invention relates to ink for general printing and writing purposes and particularly to that variety used principally in the manufacture and preparation of carbon paper.

Heretofore, ink, such as used for carbon paper has been composed of wax, oil or grease and certain dyes commonly known in the trade as "lake color," which mix with oil but do not dissolve in the same. Some of such inks also include a dye known as "oil soluble color," which dissolves and develops in oxalic acid. Ordinarily carbon papers are made principally with "lake color," but in most instances a small portion of "oil soluble color," is added for the purpose of strengthening the ink. Should it be possible to use a larger portion of "oil soluble color," the product would produce a much stronger and materially better copy. However, this cannot be done for the reason that the mentioned oxalic acid dries up the product and increases the smuttiness of the product in addition to giving rise to many other disadvantages.

Should "lake color" be used as a principal ingredient in the manufacture of carbon paper, it is found that the type impressions on the carbon copies are frequently dim, weak, obscure or partly obliterated due to the fact that the wax has a tendency to act against the strength of the color. This is particularly noticeable when large numbers of carbon copies are produced at the time of making a single original copy or when the carbon paper or typewriter ribbon, as the case may be, is used for some little time.

My invention therefore pertains to the production of ink from which stronger, more prominent and brighter or sharper written reproductions can be made, and it consists in using a certain dye commonly known as "water soluble anilin dye" which will develop and dissolve in water and thereby produce an extremely powerful and brilliant color, adding the said "water soluble anilin dye" to the ink principally made with a "lake color," *i. e.* oil or grease plus wax plus "lake color." In accordance with my invention, a large proportion of "water soluble anilin dye" can be added to the ink, without the objectionable features which would be produced by adding a large portion of "oil soluble anilin dye" when it is desired to strengthen the ink.

In adding water soluble anilin dye to the ink, I do not incorporate water into the mixture in the beginning, but the mixture includes calcium chlorid, or other like hygroscopic substance of which the function is to absorb moisture from the atmosphere, and thereby prevent drying up. If I should add water in the commencement, instead of calcium chlorid, this water would evaporate and cause the ink to harden, and thereby spoil, making it entirely ineffective. By adding the calcium chlorid to the ink material instead of water, there will always be present in the product a sufficient amount of moisture, taken up by the calcium chlorid due to its hygroscopic properties, to prevent undue drying out. Water absorbed by the calcium chlorid gradually develops the color of the water-soluble anilin dye in the composition thereby producing strong powerful and brilliant color, and it is found that the copies made with this ink increase in brilliancy and color with age.

Furthermore, in order to harmonize the oil or wax and the water absorbed by the calcium chlorid, I mix a suitable amount of emulsifying agent such as an alkali, which may be in the form of soap containing an alkali, *e. g.* uncombined soda.

The preparation can be applied not only to ink used in the making of carbon paper, but typewriter ribbons, printing ink and the like or in fact, any printing or writing substance prepared with oil or grease.

This process forming my invention of adding "alkali" to such ink, can be extended to the process of making ink for certain kinds of carbon paper and typewriter ribbons now in use which are commonly known as "copying carbon paper" or "copying typewriter ribbon" which contains "water soluble anilin dye" in the ink which when transferred upon the paper as impressions of letters will develop and give forth one or a number of duplicate copies onto another sheet of paper containing water because the "alkali" will harmonize and assist the action of the water with the dye contained in the oil.

What is claimed as new is:—

1. An ink including the reaction products of a water-soluble anilin dye, calcium chlorid, an emulsifying agent and an emulsifiable substance.

2. An ink including water-soluble anilin dye, an emulsifiable substance, calcium chlorid and an alkali.

3. A carbon paper having a coating comprising water-soluble anilin dye, combined with an emulsifiable organic base, a hygroscopic substance and an alkali.

4. Carbon paper comprising paper treated with ink including an emulsifiable organic substance, a water-soluble anilin dye, and calcium chlorid.

5. Carbon paper comprising paper treated with ink including a water-soluble anilin dye, calcium chlorid, an alkali and an emulsifiable material.

6. Carbon paper having its surface coated with a permanently pasty mixture including the reaction products of a waxy base, a water-soluble dye, a hygroscopic salt and an alkali material, substantially as and for the purposes hereinabove described.

In testimony whereof I affix my signature.

HYDESABURO OHASHI.